V. G. APPLE.
METHOD OF BUILDING INDUCTOR ELEMENTS FOR DYNAMO ELECTRIC MACHINES.
APPLICATION FILED MAY 20, 1918.

1,348,198. Patented Aug. 3, 1920.

Inventor
Vincent G. Apple.
Attys.

UNITED STATES PATENT OFFICE.

VINCENT G. APPLE, OF DAYTON, OHIO.

METHOD OF BUILDING INDUCTOR ELEMENTS FOR DYNAMO-ELECTRIC MACHINES.

1,348,198.    Specification of Letters Patent.    Patented Aug. 3, 1920.

Application filed May 20, 1918. Serial No. 235,689.

*To all whom it may concern:*

Be it known that I, VINCENT G. APPLE, a citizen of the United States, residing at Dayton, in the county of Montgomery and State of Ohio, have invented certain new and useful Improvements in Methods of Building Inductor Elements for Dynamo-Electric Machines, of which the following is a specification.

My invention relates to a method of building inductor elements for dynamo electric machines.

Some of the objects of my invention are to provide a method of building inductor elements for dynamo electric machines, such as armatures, rotors, and the like, by suitably joining adjacent ends of the conductors by welding, or otherwise, while the ends are laterally deflected and brought together under stress, and thereafter held under resilient strain by effect of the joined ends.

Separated conductors, or inductors, are usually held apart for a greater portion of their length, by suitable strips or rings of insulating, spacing material. When it becomes necessary to join the ends of these bar conductors, it has heretofore been customary to insert between the ends to be joined together, a spacing block, preferably of copper or other metal as thick, or thicker than the insulation that spaces the conductors apart, to compensate for the distance of separation effected by the insulating filler. This is an expensive process and increases the gross weight of the inductor without corresponding advantage.

In carrying my invention into effect I place a separating, insulating medium or filler strip or ring between the parallel conductor bars and continue it to a point near the ends that are to be joined together. I then apply sufficient force to the ends of the conductor bars to bring the close proximate parallel surfaces, of preferably larger area than the sectional area of the bars, together and thereafter increase this force, as the conductor ends become softened by heat, due to the heating effect of the electric current in the act of welding; further deflecting the resilient ends of the conductors sufficiently to complete the weld and then release the conductors, after the weld is finished, leaving the conductors under more or less stress.

The stress, or strained condition of the conductors, is an incident superinduced by the necessity of pressing the separated ends out of alinement and into contact with each other, out of the plane of the bars, in order to weld them. It has the effect, however, to yieldingly clamp and hold the separating insulation and to prevent relative vibrating movement of the conductors, when bodily rotated.

Another object of my invention is to electrically weld together properly paired conductors, at each end of the inductor to thereby provide a completely closed circuit of the inductive conductors, having molecular continuity of uniform character of metal, to reduce the electric loss at the joined ends of the conductors.

When an electric weld is made between armature coil terminals, there is not left at the welded joint any substance, material or condition to set up any local action counter to the prime current flowing through the armature, as when such joints are brazed or soldered together, thereby inducing substantially higher internal resistance and loss of efficiency.

In the accompanying drawings I have diagrammatically illustrated a conventional welding apparatus showing the ends of the conductors, of an armature, deflected out of alinement toward each other, in the process of being welded.

In all the views the same reference characters are employed to indicate similar parts.

Figure 1:
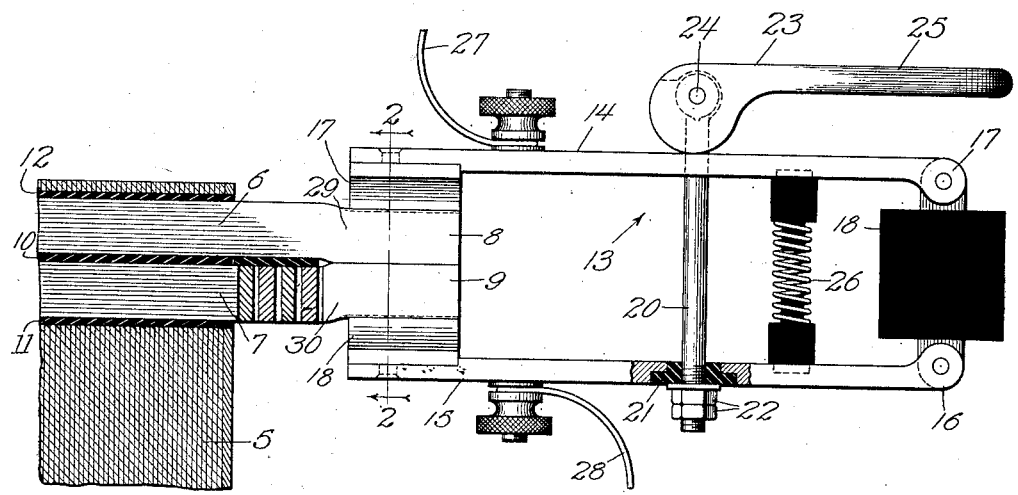
Figure 1 is an elevation in section of means for welding the armature terminals together.
Figure 2:
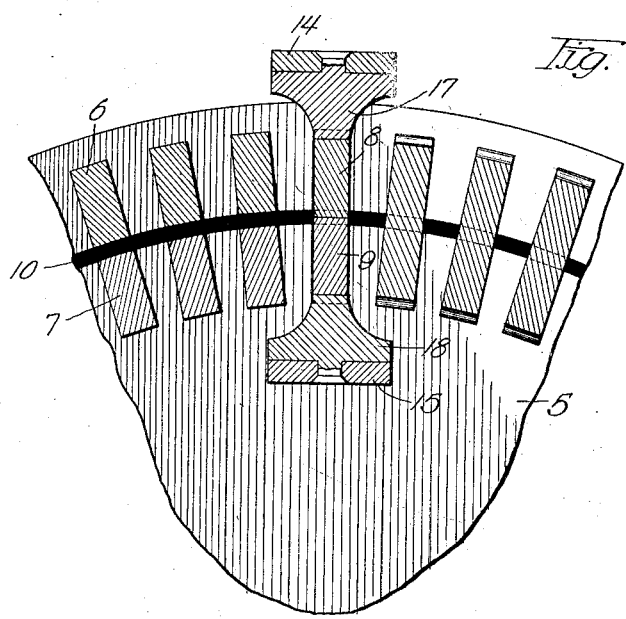
Fig. 2 is a transverse section taken on line 2—2 of Fig. 1.

The core of an armature 5 contains slots or perforations in which the substantially parallel conductors 6 and 7 are contained, having projecting ends 8 and 9, respectively. These ends may project on each side of the core and be joined together, for a purpose hereafter more specifically pointed out.

The conductors 6 and 7 are separated from each other by a strip or ring of insulating material 10, and from the core by insulating material 11 and 12, respectively. 13 is a simplified form of an electric welding machine, comprising bars 14 and 15, hinged together, as at 16 and 17; an insulating block 18 being interposed between the hinge members to prevent the current from passing directly from one bar to the other. A jaw 17 is connected to the front end of the bar 14 and a similar jaw 18 is connected to the bar 15. These jaws are for contact with the ends 8 and 9, respectively, of the conductors 6 and 7, when the said ends are brought together and welded to produce electrical and molecular continuity between the said conductors. A bolt 20 passes through the bars 14 and 15 and through an insulation bushing 21, being adjusted in length by the nut 22. The cam lever 23 is hinged to the upper end of the bolt 20, as at 24, and is provided with a handle 25 by which pressure may be applied to the bars 14 and 15, when the jaws 17 and 18 have made contact with the ends 8 and 9 of the conductors. A spring 26 opens the jaws, or presses the bars 14 and 15 apart, when released by the cam 23 of the lever 25.

Wires 27 and 28 lead to a suitable source of electric energy for the purpose of making the weld. When pressure is applied to the jaws 17 and 18, after they have made contact with the ends 8 and 9, the said ends are first deflected out of axial alinement, as at 29 and 30, so that the meeting ends of the conductors are brought into close contact or association. So soon as current, which comes over the wires 27 and 28, begins to soften the ends 8 and 9, further pressure is then applied to the lever 25, to cause the surfaces of the ends 8 and 9 to firmly weld together, thus completing metallic and molecular continuity between the bars 6 and 7 through their ends. The effect of deflecting the ends 8 and 9, out of true alinement with the body part of the bars 6 and 7, produces a resilient tension or spring at the ends of the bars, which tends to hold the insulation 10 more firmly in place and also prevents any relative vibratory movement of the bars, with respect to each other, when the armature is bodily rotated.

Having described my invention, what I claim is:—

1. The method of making inductors for dynamo electric machines which consists in separating the inducing conductor bars by insulation; drawing the ends of the bars together out of alinement with the body part of one or both and welding the ends at contacting surface to produce molecular continuity through the joined ends.

2. The method of making inductors for dynamo electric machines which consists in separating the inducing conductor bars by insulation; drawing the ends of the bars together out of alinement with the body part of one or both and welding the ends at contacting surface while under strain to produce molecular continuity through the joined ends.

3. The method of making armatures for dynamo electric machines which consists in maintaining separation of the body part of the inducing bar conductors; deflecting the ends of said conductors to bring confronting flat sides of said ends together and welding said ends.

4. The method of making armatures for dynamo electric machines which consists in separating the conductor bars by insulation, except at their ends, deflecting one or both said ends toward the other, out of alinement by application of pressure to bring the confronting surfaces together, applying a heating medium and increasing the pressure to weld said surfaces together when the metal becomes softened by the heating medium.

5. The method of making armatures which consists in relatively deflecting the ends of armature conductor bars toward each other, out of their true alinement; applying pressure to bring the deflected ends into metallic contact; passing a current of electricity through the ends so brought together; maintaining pressure as the metal softens whereby to produce a weld between the contacting ends of greater area than the cross sectional area of either conductor.

In testimony whereof I hereunto set my hand.

VINCENT G. APPLE.